United States Patent
Johansson (10) Patent No.: US 10,142,253 B2
(45) Date of Patent: Nov. 27, 2018

(54) METHOD FOR EFFICIENT RELIABLE TRANSMISSION

(71) Applicant: MEDIATEK INC., Hsinchu (TW)

(72) Inventor: Per Johan Mikael Johansson, Kungsangen (SE)

(73) Assignee: HFI Innovation INC., HsinChu (TW)

( * ) Notice: Subject to any disclaimer, the term of this patent is extended or adjusted under 35 U.S.C. 154(b) by 48 days.

(21) Appl. No.: 15/343,551

(22) Filed: Nov. 4, 2016

(65) Prior Publication Data

US 2017/0134297 A1   May 11, 2017

Related U.S. Application Data

(60) Provisional application No. 62/251,794, filed on Nov. 6, 2015.

(51) Int. Cl.
| | |
|---|---|
| H04L 12/26 | (2006.01) |
| H04L 12/875 | (2013.01) |
| H04L 1/16 | (2006.01) |
| H04W 28/02 | (2009.01) |

(52) U.S. Cl.
CPC .............. *H04L 47/564* (2013.01); *H04L 1/16* (2013.01); *H04W 28/0278* (2013.01)

(58) Field of Classification Search
USPC ................ 370/216, 236, 241, 252, 328, 474
See application file for complete search history.

(56) References Cited

U.S. PATENT DOCUMENTS

| | | | | |
|---|---|---|---|---|
| 7,912,093 | B2 * | 3/2011 | Chitrapu | H04L 1/1664 |
| | | | | 370/346 |
| 9,686,049 | B2 * | 6/2017 | Fischer | H04L 1/1854 |
| 2006/0034274 | A1 * | 2/2006 | Kakani | H04L 1/1829 |
| | | | | 370/389 |

(Continued)

FOREIGN PATENT DOCUMENTS

| | | |
|---|---|---|
| CN | 101252615 A | 8/2008 |
| CN | 102739657 A | 10/2012 |
| CN | 103491597 A | 1/2014 |

OTHER PUBLICATIONS

International Search Report and Written Opinion of International Search Authority for PCT/CN2016/104873 dated Jan. 26, 2017 (10 pages).

*Primary Examiner* — Kwang B Yao
*Assistant Examiner* — Nguyen H Ngo
(74) *Attorney, Agent, or Firm* — Imperium Patent Works; Mark Marrello (57) ABSTRACT

A method of reliable and efficient information exchange between a first and a second entity, includes receiving data from the first entity by the second entity, determining if a response to the received data is required based on received control information, determining a response time during which the response is to be sent to the first entity (when a response is required), generating the response before expiration of the response time, and transmitting the response to the first entity before the expiration of the response time. The control information is received along with the data from the first entity. The control information includes an indication as to what type of response is required. In one example, the response is included in an unrelated scheduled transmission that is the next scheduled transmission from the second entity to the first entity.

17 Claims, 8 Drawing Sheets

(56) References Cited

U.S. PATENT DOCUMENTS

| | | | |
|---|---|---|---|
| 2006/0083233 A1* | 4/2006 | Nishibayashi | H04L 1/1621 370/389 |
| 2006/0248429 A1* | 11/2006 | Grandhi | H04L 1/1664 714/749 |
| 2010/0039926 A1* | 2/2010 | Zhang | H04L 1/1692 370/208 |
| 2010/0215008 A1* | 8/2010 | Wang | H04W 72/10 370/329 |
| 2011/0166772 A1 | 7/2011 | Ferro et al. | 701/120 |
| 2012/0327838 A1 | 12/2012 | Seok | 370/312 |
| 2013/0028177 A1* | 1/2013 | Koskela | H04W 4/005 370/328 |
| 2014/0029453 A1* | 1/2014 | Trainin | H04W 24/10 370/252 |
| 2017/0019231 A1* | 1/2017 | Mammoser | H04L 5/0055 |
| 2017/0070914 A1* | 3/2017 | Chun | H04L 1/0026 |
| 2017/0134297 A1* | 5/2017 | Johansson | H04L 1/16 |
| 2017/0155490 A1* | 6/2017 | Wang | H04L 5/0055 |

* cited by examiner

EXPLICIT CONTROL INFORMATION, E.G.
00 NO RESPONSE REQUESTED
01 IMMEDIATE RESPONSE REQUESTED
10 DELAYED RESPONSE REQUESTED
11 ONLY OPPORTUNISTIC RESPONSE

FIG. 7

IMPLICIT CONTROL INFORMATION, E.G.
XXXX MESSAGE IDENTITY,
WHERE THE MESSAGE IDENTITY MAPS TO A
CERTAIN RESPONSE BEHAVIOUR IN A HARD-
CODED MAPPING

METHOD FOR EFFICIENT RELIABLE TRANSMISSION

CROSS REFERENCE TO RELATED APPLICATIONS

This application claim priority under 35 U.S.C § 119 from U.S. Provisional Application No. 62/251,794 entitled "A method for Efficient Reliable Transmission" filed on Nov. 6, 2015, the subject matter of which is incorporated herein by reference.

TECHNICAL FIELD

The disclosed embodiments relate generally to wireless communication, and, more particularly, to functionality for reliable transmission.

BACKGROUND

Current methods for reliable transmission depend on feedback responses for all transmissions to indicate if the transmissions have been successfully received. These methods are rigid and require twice the amount of messaging compared to the messaging without feedback responses.

SUMMARY

In a first novel aspect, a method of reliable and efficient information exchange between a first and a second entity, includes receiving data from the first entity by the second entity, determining if a response to the received data is required based on received control information, determining a response time during which the response is to be sent to the first entity, generating the response before expiration of the response time, and transmitting the response to the first entity before the expiration of the response time.

In a second novel aspect, the control information is received along with the data from the first entity and includes an indication as to what type of response is required.

In a third novel aspect, the response is included in an unrelated scheduled transmission that is the next scheduled transmission from the second entity to the first entity.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
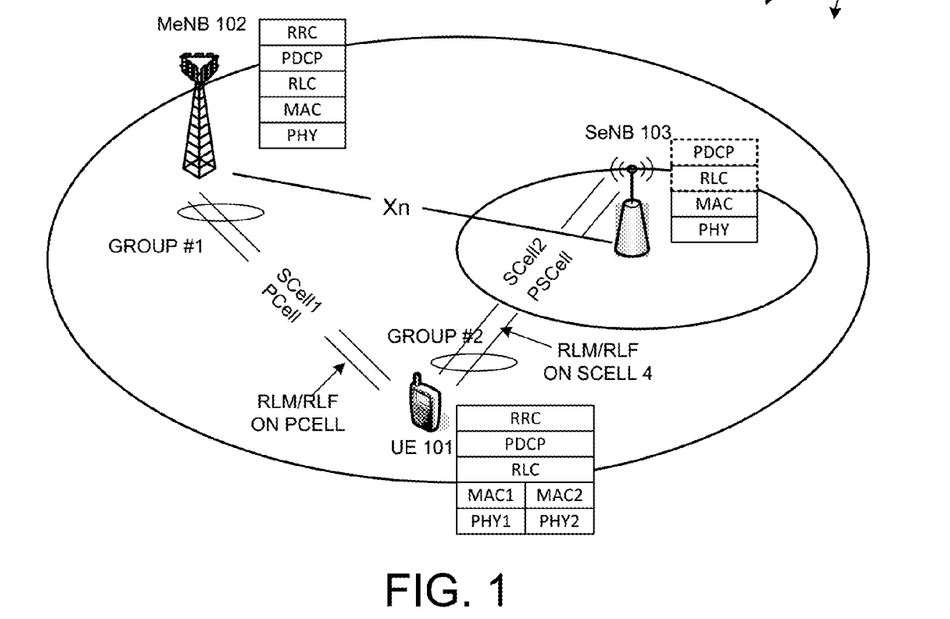
FIG. 1 illustrates a smallcell network with inter-eNB carrier aggregation (CA) and RLF/RLM mechanism and RRC re-establishment for Dual Connectivity UE.

FIG. 1 illustrates a smallcell network 100 with inter-eNB carrier aggregation and RLF/RLM mechanism and RRC re-establishment for Dual Connectivity (DuCo) UE in a smallcell network 100. In 3GPP Long-Term Evolution (LTE) Rel-12 and after, besides normal base stations, small base stations with low transmission power and simplified protocol stacks and functionalities are introduced into E-UTRAN, which is referred to as smallcell networks. The smallcell architecture can be used to enhance the data throughput and to reduce the mobility signaling overhead. Smallcell network 100 comprises UE 101, a master base station MeNB 102, and a secondary base station SeNB 103.

As illustrated in FIG. 1, UE 101 establishes an RRC connection with MeNB 102 over at least a primary serving cell (e.g., PCELL and SCELL1 with MeNB), while served by one or more SeNBs over one or more secondary serving cells (e.g., PSCELL and SCELL2 by SeNB). When UE 101 is served by both MeNB and SeNB, the control of UE 101 and the user plane functionality is on the MeNB. Since a SeNB and a MeNB may not be physically collocated, there should be transmission medium and interface between the MeNB and the SeNB. Assume Xn interface is introduced for communications between the MeNB and the SeNB. From real deployment perspective, it cannot always assume the ideal backhaul connections, e.g., optical fiber, exist between the MeNB and the SeNB.

FIG. 1 also shows an exemplary DuCo architecture. The groups of serving cells associated with MeNB 102 and SeNB 103 are referred to master cell group (MCG) and secondary cell group (SCG), respectively. At UE 101 side, radio link monitoring (RLM) is implemented on the PCELL of MCG, in order to monitor the link quality toward MeNB, and declare radio link failure (RLF) when out-of-sync condition is detected. For SeNB, S-RLM and S-RLF on PSCell of SCG can be interpreted similarly. Upon RLF, UE 101 performs RRC connection re-establishment, in which the first step is to search for a suitable cell via cell selection. While UE 101 may intuitively try to re-establish RRC connection on the macrocell layer, for RRC connection re-establishment due to RLF-related causes, it is likely that all suitable cells are associated with the SeNB. The RRC connection re-establishment can succeed only when performed on an eNB with valid UE context, and such eNB is said to be a "prepared" eNB. Since a SeNB is typically not fully prepared, re-establishment on the SeNB is highly probable to fail. However, successful re-establishments on SeNB are still possible by applying current RRC re-establishment procedure and reusing other RRC procedures already defined in the specifications.

In accordance with one novel aspect, an enhanced efficient reliable transmission mentioned is proposed by addressing the following three problems: 1) How does a communication entity determine if a response to received information is required by the entity that sent the information? 2) How does a receiving entity efficiently and reliably communication a response when necessary? It is important that this functionality adds little to no additional bandwidth requirements due to already over burdened networks.

Figure 2:
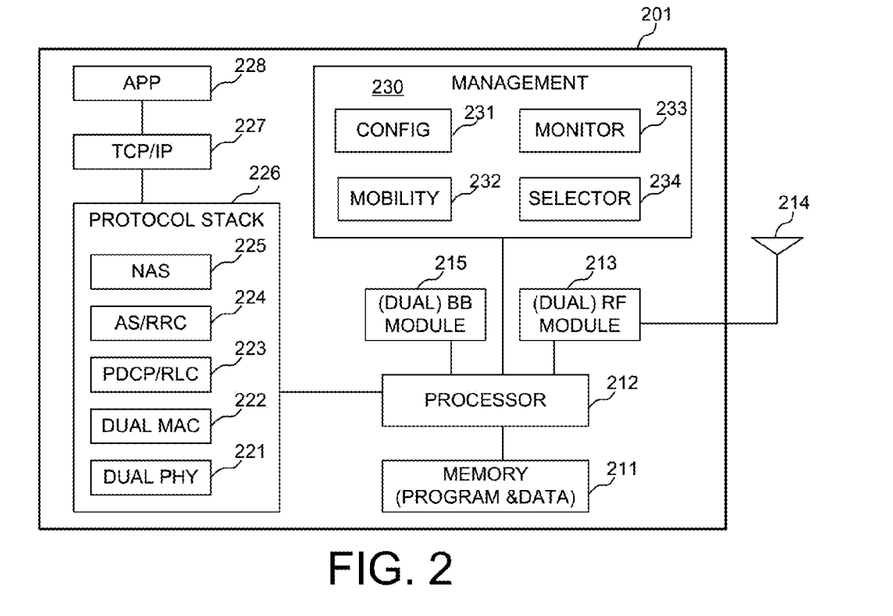
FIG. 2 is a simplified block diagram of a UE with dual connectivity that carries out certain embodiments of the present invention.

FIG. 2 is a simplified block diagram of a UE 201 with dual connectivity that carries out certain embodiments of the present invention. UE 201 has an antenna (or antenna array) 214, which transmits and receives radio signals. A RF transceiver module (or dual RF modules) 213, coupled with the antenna, receives RF signals from antenna 214, converts them to baseband signals and sends them to processor 212 via baseband module (or dual BB modules) 215. RF transceiver 213 also converts received baseband signals from processor 212 via baseband module 215, converts them to RF signals, and sends out to antenna 214. Processor 212 processes the received baseband signals and invokes different functional modules to perform features in UE 201. Memory 211 stores program instructions and data to control the operations of UE 201.

UE 201 also includes a 3GPP protocol stack module 226 supporting various protocol layers including NAS 225, AS/RRC 224, PDCP/RLC 223, dual MAC 222 and dual PHY 221, a TCP/IP protocol stack module 227, an application module APP 228. UE 201 with dual connectivity has two MAC entities. Two sets of upper layer stacks (RLC/PDCP) are configured for the MAC entities. At the RRC layer, only one RRC 224 is configured. RRC 224 controls the protocol stacks in corresponding to the MAC entities by communicating with the RRC entity of its serving MeNB.

UE 201 further comprises a management circuit 230 including a configuration circuit 231, a mobility estimation circuit 232, a monitor circuit 233, and a selection circuit 234. The circuits are function modules that can be configured and implemented by hardware, firmware, and software, or any combination thereof. The function modules, when executed by processor 212 (via program instructions and data contained in memory 211), interwork with each other to allow UE 201 to perform certain embodiments of the present invention accordingly. Configuration circuit 231 obtains configuration information from its serving MeNB and applies corresponding parameters, mobility estimation circuit 232 determines UE mobility based on UE speed, movement, and cell count, monitor circuit 233 performs radio link monitoring (RLM) and radio link failure (RLF) procedure, and selection circuit 234 performs cell selection for RRC reestablishment upon detecting RLF over the PCELL.

Figure 3:
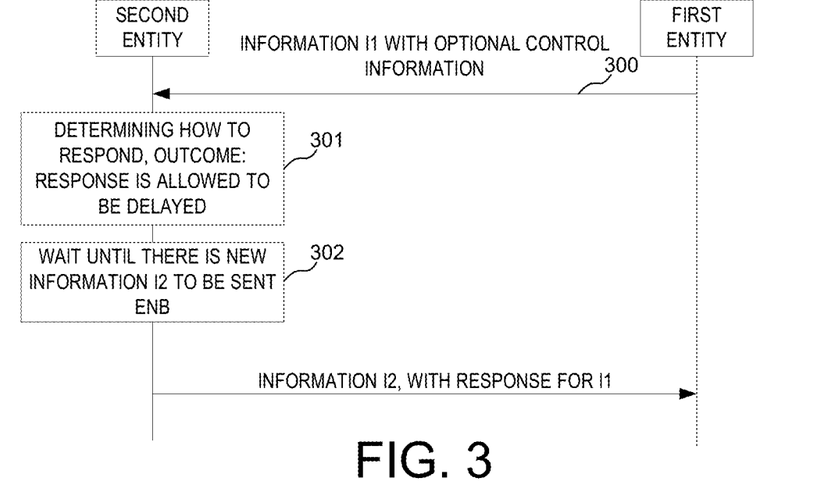
FIG. 3 is a diagram illustrating a first example of efficient communication between a first entity and a second entity.
Figure 4:
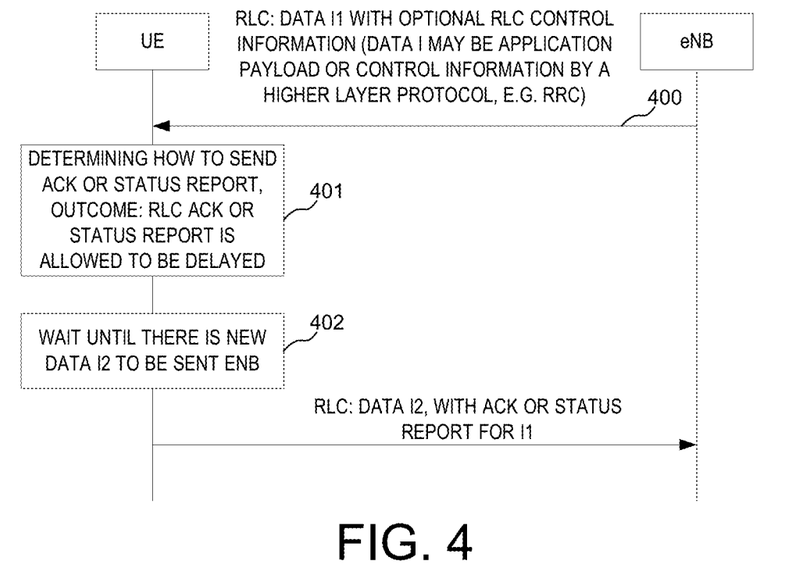
FIG. 4 is a diagram illustrating a second example of efficient communication between a first entity and a second entity.
Figure 5:
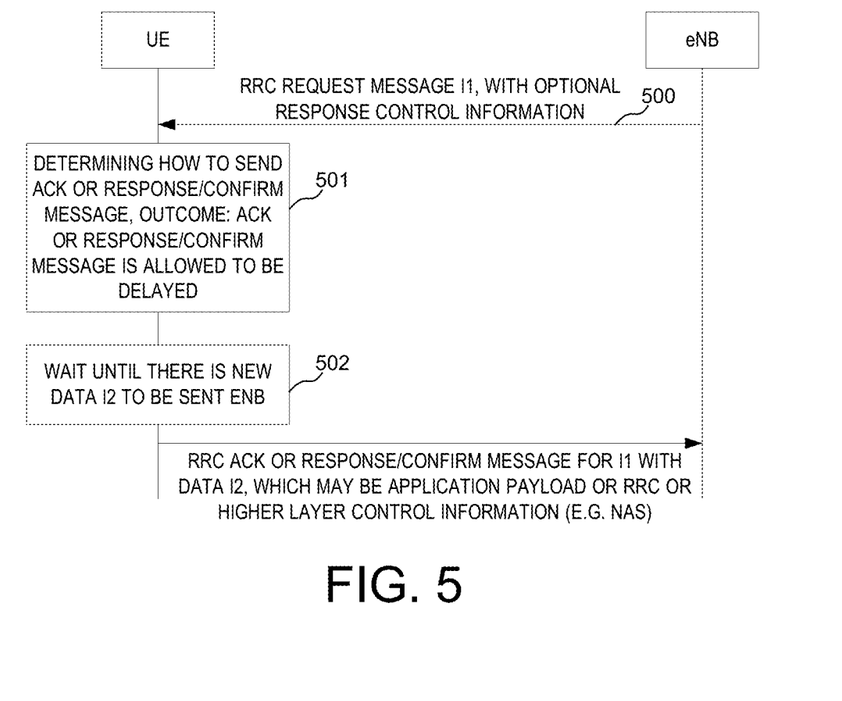
FIG. 5 is a diagram illustrating a third example of efficient communication between a first entity and a second entity.

FIG. 3, FIG. 4 and FIG. 5 illustrate three different examples of how a response to received information can be communicated to an entity that transmitted the information.

FIG. 3 is a diagram illustrating communication between a generic first entity and a generic second entity. First, information I ("data") is communicated from the first entity to the second entity in step 300. In response to receiving the information I1 from the first entity, the second entity determines (i) if a response is required, and (ii) when a response is required, the time frame in which the response must be transmitted by the second entity ("response time") in step 301. The second entity can make this determination utilizing various methods.

Figure 7:
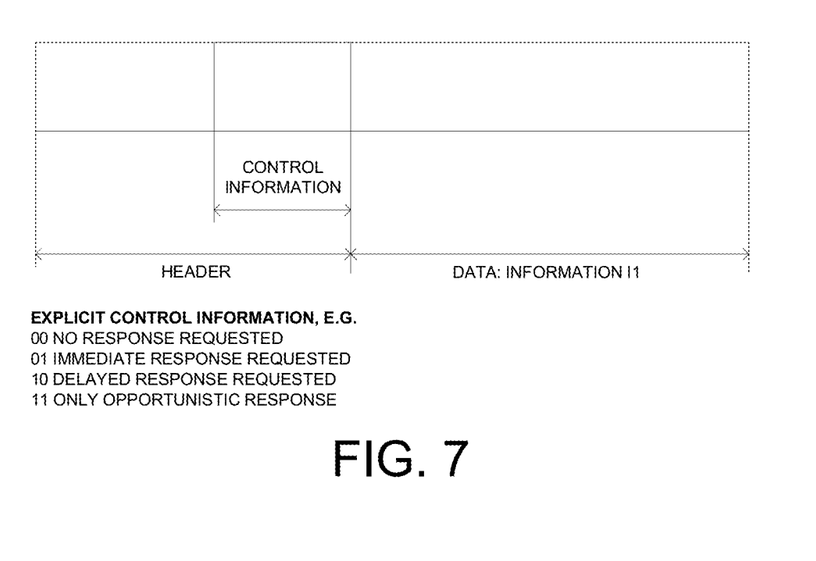
FIG. 7 is a diagram of a packet including explicit control information in the header portion of a packet.

In a first method, the second entity reads a group of bits from a field within the header of the received information I1, where the group of bits explicitly indicate if a response is requested and the requested response time. An example of this method is illustrated in FIG. 7. FIG. 7 illustrates that two bits of control information are included in the header. A value of "00" indicates that no response is requested. In this scenario, the second entity does need to send a response to the first entity. A value of "01" indicates that an immediate response is requested. In this scenario, the second entity has to determine a way to transmit a response to the first entity as soon as possible. A value of "10" indicates that a delayed response is requested. In this scenario, the second entity has to determine a way to transmit a response within a delay period ("before expiration of a response time"). The delay period or "response time" can be a predetermined amount of time that is programmed into the second entity. The delay can alternatively be indicated by another portion of the control information. A value of "11" indicates that only an opportunistic response is requested. In this scenario, the second entity transmits a response only if another transmission from the second entity to the first entity is already scheduled.

Figure 8:
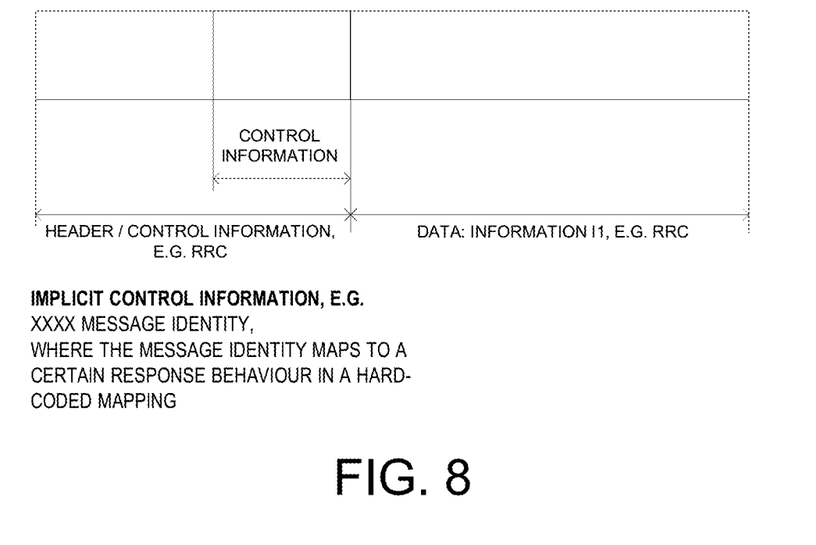
FIG. 8 is a diagram of a packet including implicit control information in the header portion of a packet.

In a second method, the second entity reads a group of bits from a field within the header of the received information I, where the group of bits implicitly indicate if a response is requested and the requested response time. An example of this method is illustrated in FIG. 8. FIG. 8 illustrates that four bits of control information are included in the header. The four bits are a message identity. The message identity is used to lookup a predetermined response behavior for the received message ("information I" or "data"). In this fashion, the second entity can lookup in local memory whether a response is requested for the received information I, and what the requested response time is.

In step 301 it is determined that a response is requested by the first entity and the response time is determined. The second entity then determines that another unrelated transmission from the second entity to the first entity is schedule before the expiration of the response time. The second entity then determines that there is enough free space in the unrelated transmission from the second entity to the first entity such that the response can be stored in the free space portion of the unrelated transmission. The second entity then waits for transmission of I2 in step 302. The response is then communicated from the second entity to the first entity via the unrelated transmission that communicates information I2.

Communicating the response this fashion avoids transmission of an additional packet to enable the transmission of the response. Rather, the response is inserted into an unrelated packet that is already scheduled for transmission. This is also referred to herein as a "no-overhead response".

Alternatively, in the event that there (i) is no scheduled transmission before the expiration of the response time, or (ii) there is not enough free space available in the scheduled transmission, then the second entity will generate a new packet so to communicate the response from the second entity to the first entity.

FIG. 4 illustrates a variation of the example illustrated in FIG. 3. FIG. 4 illustrates a 3GPP system. The first entity is an eNB, and the second entity is a UE. In this example, the protocol where the information is transferred and the response is generated is the Radio Link Control (RLC) protocol. The response is an RLC Status report or an RLC Ack. The Information I1 that may warrant a response may be application payload, or control information, e.g. by Radio Resource Control (RRC). A benefit of reusing the RLC protocol is simplicity, as it already contains basic functions for reliable transmission.

First, data I1 is communicated from the eNB to the UE in step 400. In response to receiving the data I1 from the eNB, the UE determines (i) if a response is required, and (ii) when a response is required, the time frame in which the response must be transmitted by the UE ("response time") in step 401. The UE can make this determination utilizing various methods illustrated in FIG. 7 and FIG. 8, as described above. In step 401 it is determined that a response is requested by eNB and the response time is determined. The response may be a Radio Link Channel (RLC) acknowledgement or a status report. The UE then determines that another unrelated transmission from the UE to the eNB is schedule before the expiration of the response time. The UE then determines that there is enough free space in the unrelated transmission from the UE to the eNB such that the response can be stored in the free space of the unrelated transmission. The UE then waits for transmission of I2 in step 402. The response is then communicated from the UE to eNB via the unrelated transmission that communicates information I2. Communicating the response in this fashion avoids transmission of an additional packet to enable the transmission of the response. Rather, the response is inserted into an unrelated packet that is already scheduled for transmission.

Alternatively, in the event that there (i) is no scheduled transmission before the expiration of the response time, or (ii) there is not enough free space available in the scheduled transmission, then the second entity will generate a new packet so to communicate the response from the second entity to the first entity.

FIG. 5 illustrates another variation of the example illustrated in FIG. 4, where the response behavior is implemented in the RRC protocol. The response could be a RRC confirm or RRC response message. The benefit for implementing this in RRC is that in case RLC is not needed for other purposes than reliable transmission of RRC messages, it may be both even more simple and more efficient to implement Ack/Nack/retransmit behavior in RRC.

In general, the first entity and the second entity may be UE, eNB, relay UE, relay eNB, or any future architectural entities the correspond to current eNB or part thereof.

First, message I1 is communicated from the eNB to the UE in step 500. In response to receiving the message I1 from the eNB, the UE determines (i) if a response is required, and (ii) when a response is required, the time frame in which the response must be transmitted by the UE ("response time") in step 501. The UE can make this determination utilizing various methods illustrated in FIG. 7 and FIG. 8, as described above. In step 501 it is determined that a response is requested by eNB and the response time is determined. The response may be a Radio Link Channel (RLC) acknowledgement, a status report, or a message confirmation. The UE then determines that another unrelated transmission from the UE to the eNB is schedule before the expiration of the response time. The UE then determines that there is enough free space in the unrelated transmission from the UE to the eNB such that the response can be stored in the free space of the unrelated transmission. The UE then waits for transmission of I2 in step 502. The response is then communicated from the UE to eNB via the unrelated transmission that communicates data I2. Communicating the response in this fashion avoids transmission of an additional packet to enable the transmission of the response. Rather, the response is inserted into an unrelated packet that is already scheduled for transmission.

Alternatively, in the event that there (i) is no scheduled transmission before the expiration of the response time, or (ii) there is not enough free space available in the scheduled transmission, then the second entity will generate a new packet so to communicate the response from the second entity to the first entity.

Figure 6:
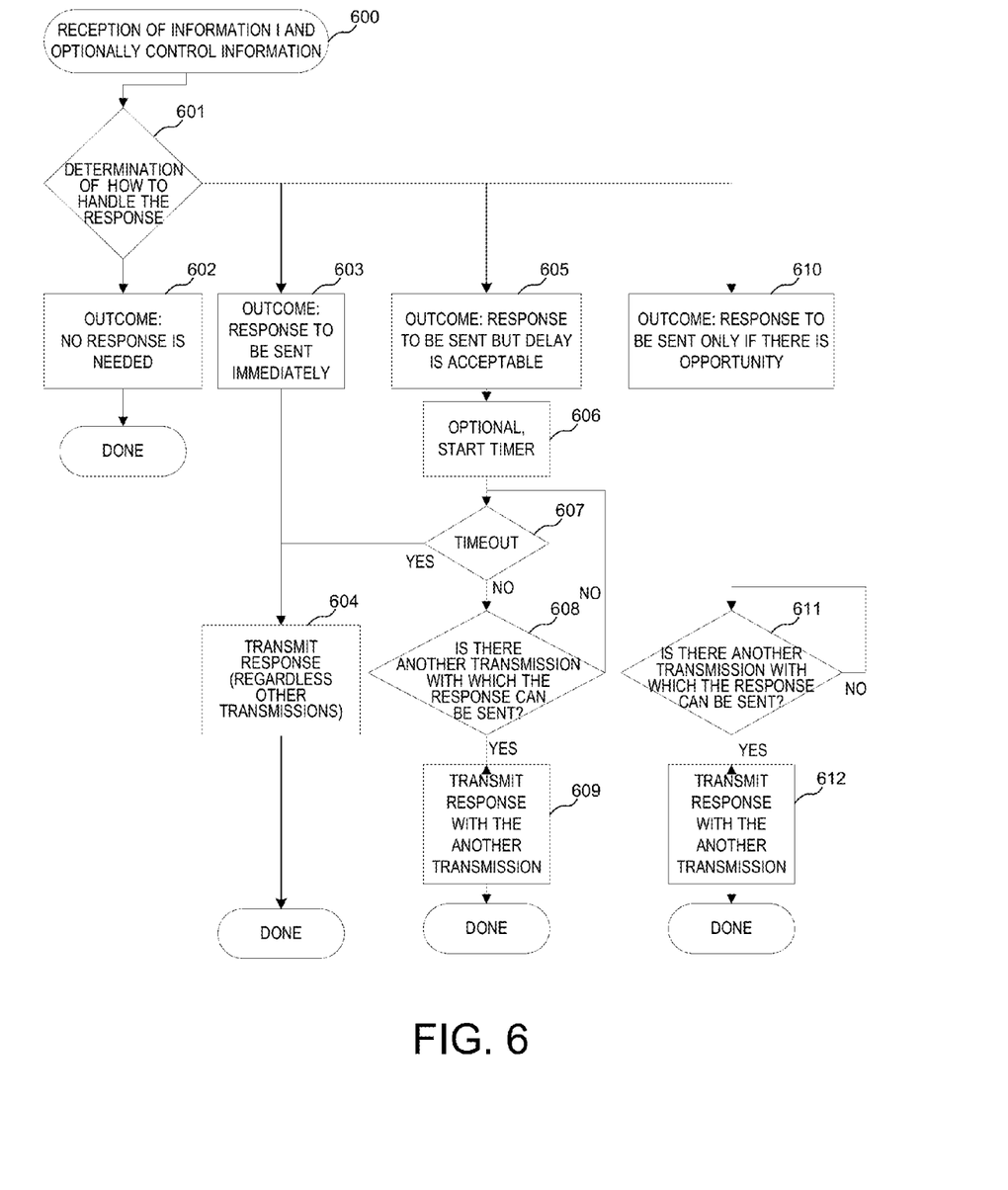
FIG. 6 is a flowchart illustrating an example of the steps taken by the receiving entity ("second entity") in determining how to respond to the received information.

FIG. 6 is a flowchart illustrating an example of the steps taken by the receiving entity ("second entity") in determining how to respond to the received information (I1). In particular, whenever the determination concludes that a response is needed but is allowed to be delayed, the delay is limited by a timer. Possibly a similar timer can be used also if the response is to be sent only if there is opportunity, where entity gives up waiting and discards the response when the timer expires (not shown in the figure). "Only if there is opportunity" denotes the case when the response can be sent with another transmission in replacement of potential padding, i.e. without additional overhead. The possible outcome "no response needed" is particularly useful when a response is not needed and this transmission is the last one in a sequence of transmissions.

In step 600 information I is received along with control information (optional) from the first entity. In step 601 it is determined why type of response, if any, is requested. If no response is requested, the flow continues to step 602 and no response is communicated to the first entity.

If a response is requested, and it is requested immediately, then the flow continues to step 603. At this point the second entity determines if a unrelated transmission from the second entity to the first entity is ready to be sent and if there is free space available in the unrelated transmission. If the unrelated transmission is ready to be sent and has sufficient free space, then the response is inserted into the unrelated transmission and the unrelated transmission is transmitted to the first entity. If there is no unrelated transmission that is ready for transmission or there is insufficient free space in the unrelated transmission, then the second entity creates a new packet that is used to communicate the response to the first entity.

If a response is requested and a delay ("response time") is acceptable, then the flow continues to step 605. A timer may be started (step 606) to allow the second entity to accurately keep time of the response time. The second entity determines if there is an unrelated transmission with sufficient free space scheduled to be transmitted before the expiration of the response time (step 608). If there is an unrelated transmission with sufficient free space scheduled to be transmitted before expiration of the response time, then the second entity inserts the response into the unrelated transmission and waits for the unrelated transmission to be sent (step 609). If there is not an unrelated transmission with sufficient free space scheduled to be transmitted before expiration of the response time, then the second entity generates a new packet that includes the response and transmits the new packet to the first entity (step 604).

If a response is requested, but not necessary ("only if there is opportunity") (step 610) then the second entity determines if there is an unrelated transmission with sufficient free space scheduled to be transmitted regardless of timing (step 611). In this scenario the response is not sent to the first entity until an unrelated transmission is scheduled from the second entity to the first entity.

FIG. 7 and FIG. 8 illustrate examples of the optional control information that is sent with information I1. In this document the notation "control information" is specifically used denoting control information that is applicable to the determination how to respond. The benefit of this is that the sender of certain information can to certain extent decide how repose shall be done, i.e. this flexibility is expected to reduce overhead for responses.

FIG. 7 illustrates an example where explicit control information is encoded in a header field. In case the protocol is the RLC protocol, this header field could be seen as an extension of the poll field.

FIG. 8 illustrates a more hard-coded variation, where a transmission is identified in implicit control information, e.g. by a message ID, or transmission type ID etc, where the response is predefined for different IDs. For simplicity in making specifications and testing, this could be a preferred way, e.g. if the reliability functions are implemented as a part of RRC.

Figure 9:
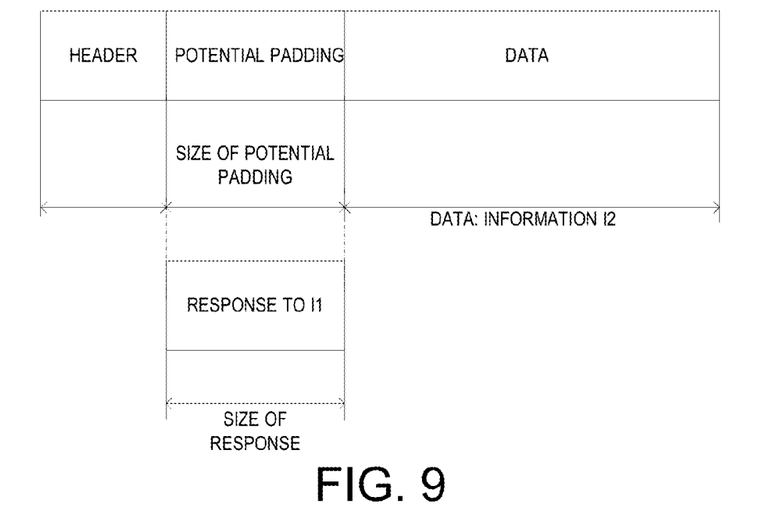
FIG. 9 is a diagram illustrating a response that is included in a padding region of a header.
Figure 10:
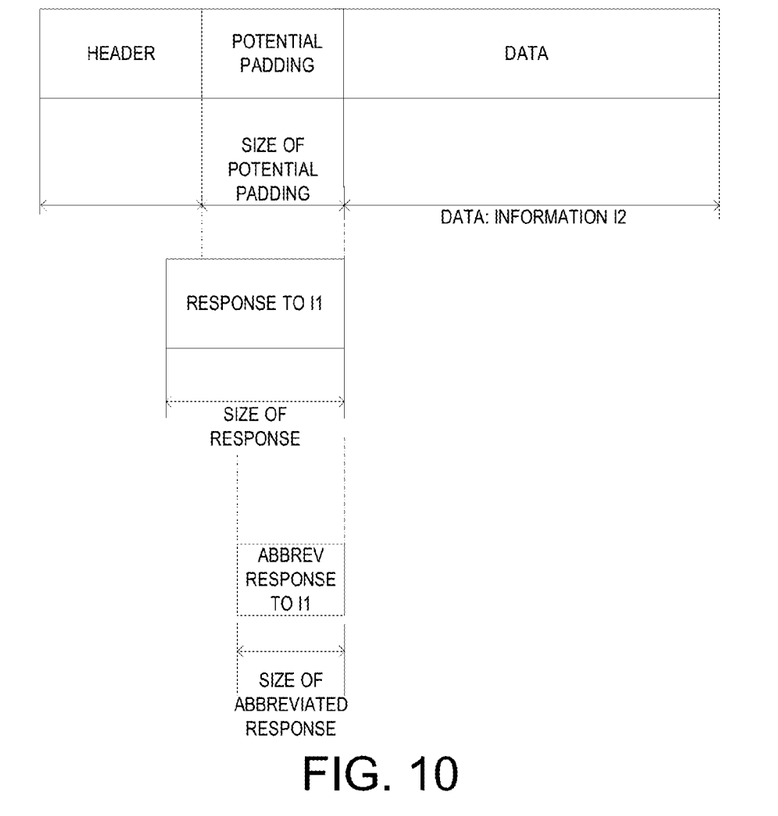
FIG. 10 is a diagram illustrating an abbreviated response that is included in a padding region of a header.

FIG. 9 and FIG. 10 illustrate how the second entity determines if a response can be sent together with another transmission that carries other Information I2, or not. It is assumed that when information I2 is to be sent, a transport block of a certain size is allocated for the transmission, either chosen by the second entity or most likely allocated by a scheduler, which is housed in another entity. As illustrated in FIG. 9, if the transport block has potential padding greater than the size of the response, then the response can be inserted in place of the potential padding. FIG. 10 illustrates the case when the size of the potential padding is less than the size of the response. In this case, the response cannot be inserted in place of the potential padding within the transport block along with information I2. It is assumed that a response to information I1 will provide identification of the information I1 somehow (e.g. a sequence number, or a message identity etc.) In the scenario illustrated in FIG. 10, an abbreviated response that fits into the potential padding ("free space") can be used instead of a full response.

For non-complex cases, an abbreviated response may be sufficient, for example, in cases when small amounts of data are sent and only one PDU at a time is outstanding. In such cases, in one embodiment a one-bit ACK indication would be sufficient and used as an abbreviated response.

In another example, abbreviated identification of information I1 could be used. For example, only the least significant bits of the sequence number or the message ID may be used. Note that in systems where both full and abbreviated responses may be used, there is a risk that the sender receiver contexts gets desynchronized if abbreviated responses are used. For example, in cases when a large amount of data is transmitted and there are several outstanding data units with different sequence numbers. In such system, it is beneficial if the sender can signal weather abbreviated response is acceptable, or whether full response is required. In this scenario, control information, such as illustrated in FIG. 9, could be further extended to also include "request full response" (not shown). The "request full response" control information would indicate to the second entity that an abbreviated response is not acceptable.

Figure 11:
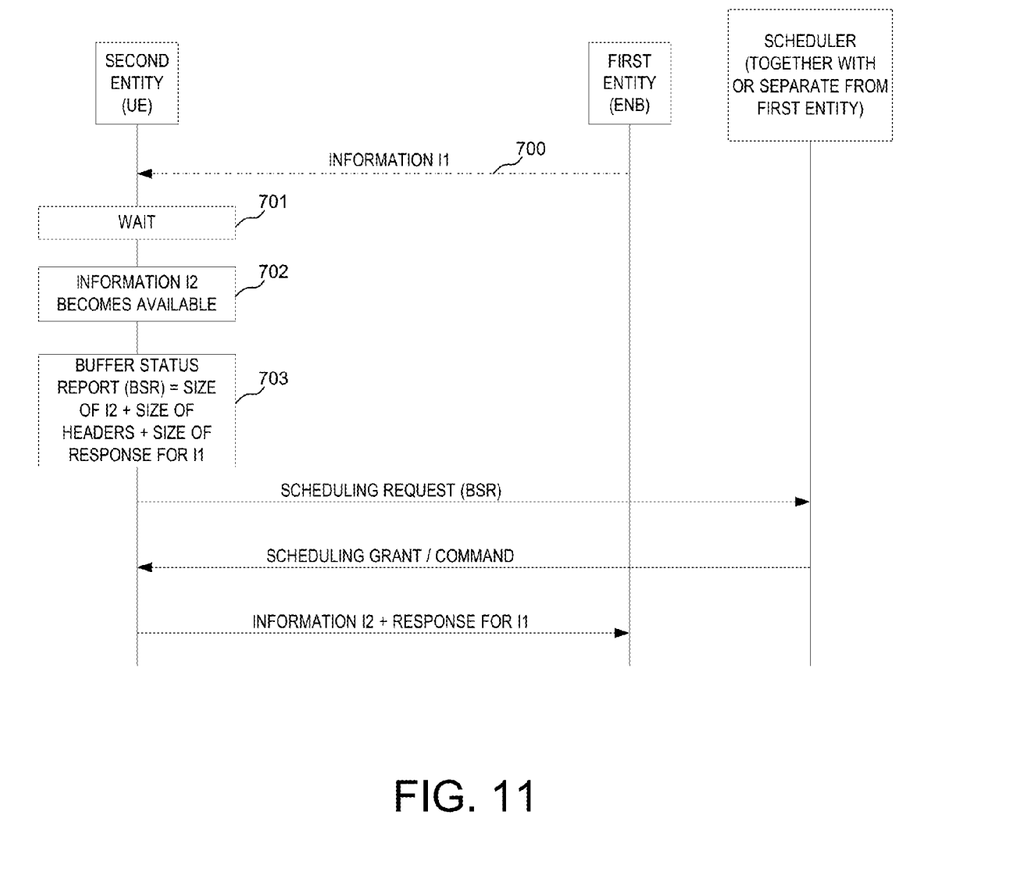
FIG. 11 is a diagram illustrating a fourth example of efficient communication between a first entity and a second entity.

FIG. 11 shows an exemplary adaptation that is applicable to a system where transmissions are scheduled by a scheduler and where the scheduler needs additional information from the originating entity to perform the scheduling. The most typical example is when a Buffer Status Report (BSR) containing the size of the data to be transmitted, is signaled to the scheduler, which subsequently will allocate a transport block of adequate size for the transmission. In such system as shown in the example of FIG. 11, it is beneficial to include the size of the responses or potential responses to the size of information I2 that is reported to in the BSR. Increasing the size of the reported in the BSR for information I2 will increase the likelihood that a separate transmission will not be needed to send the response from the second entity to the first entity.

In step 700 information I1 is transmitted from the first entity to the second entity. In response to receiving the information I1, the second entity performs the steps described above regarding FIG. 6 (steps 701 and 702). In step 703, after the response is generated, the size of the response is added to the size of the selected unrelated transmission that is going to be transmitted from the second entity to the first entity. This resulting size of this summation is reported to the scheduler as being the size of information I2. In response to the BSR scheduling request, the scheduler transmits a scheduling grant/command to the second entity. In response to receiving the scheduling grant/request, the second entity transmits the unrelated transmission including the information I2 and the response to information I1 without the need for any second transmission.

Figure 12:
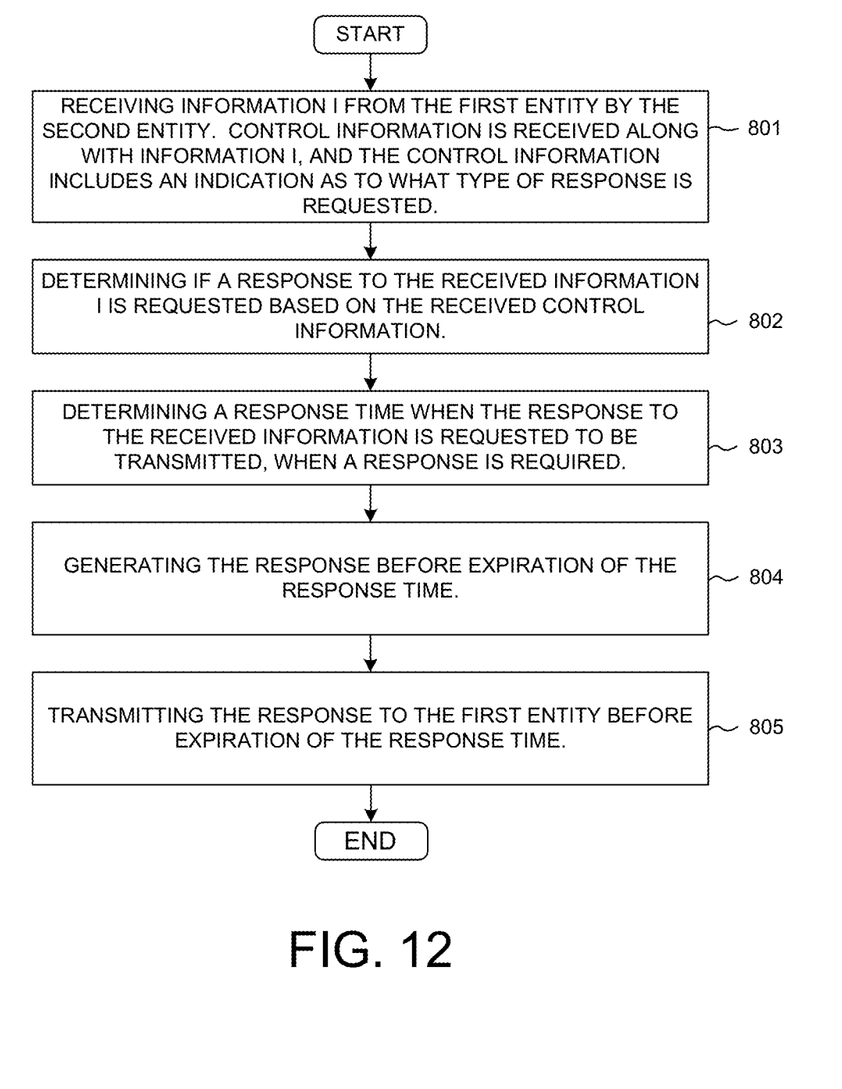
FIG. 12 is a flowchart illustrating the steps included in an efficient reliable transmission.

FIG. 12 is a flowchart. In step 801, information I is received from the first entity by the second entity. Control information is received along with the information I1. The control information includes an indication as to what type of response is requested. In step 802, it is determined if a response to received information I1 is requested. The determination is made based on the received control information. In step 803, a response time in which the response is requested is determined. In step 804, a response to information I1 is generated. In step 805, the response is transmitted to the first entity before expiration of the response time.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method of reliable and efficient information exchange between a first and a second entity, the method comprising:
   receiving data from the first entity by the second entity, wherein control information is received along with the data, and wherein the control information includes an indication as to what type of response is required;
   determining if a response to the received data is required based on the received control information;
   determining a response time during which the response is to be sent to the first entity; and
   transmitting the response to the first entity before the expiration of the response time, wherein the control information includes a field that indicates if the response is required, wherein the field of the control information also indicates the response time, and wherein the field maps to a table that indicates if a response is requested and the response time.

2. The method of claim 1, wherein the response is required, wherein the response is required to be transmitted immediately, and wherein the response is included in an unrelated scheduled transmission that is the next scheduled transmission from the second entity to the first entity.

3. The method of claim 1, wherein the response is required, wherein the response is required to be transmitted immediately, wherein there is no scheduled transmission between the second entity and the first entity, and wherein the second entity transmits the response to the first entity without including the response in another scheduled transmission between the second entity and the first entity.

4. The method of claim 1, wherein the response is required, wherein the response is not required to be transmitted immediately, wherein the response is required to be transmitted before expiration of the response time, and wherein the response is included in the next scheduled transmission before expiration of the response time from the second entity to the first entity.

5. The method of claim 1, wherein the response is required, wherein the response is not required to be transmitted immediately, wherein the response is required to be transmitted before expiration of the response time, wherein another unrelated transmission is not scheduled before expiration of the response time, and wherein the response is transmitted from the second entity to the first entity without including the response in another scheduled transmission between the second entity and the first entity.

6. The method of claim 1, wherein the response is required, wherein the response is not required to be transmitted within any specific time, and wherein the response is only transmitted from the second entity to the first entity when a scheduled unrelated transmission from the second entity to the first entity is transmitted.

7. The method of claim 1, wherein the field is four bits wide.

8. The method of claim 1, wherein the control information is included in a header of a packet that includes the received data.

9. The method of claim 1, wherein the field explicitly indicates if a response is requested and the response time.

10. The method of claim 1, further comprising:
determining if an abbreviated response or the complete response is required.

11. The method of claim 1, further comprising:
starting a timer in response to receiving the data from the first entity.

12. The method of claim 1, further comprising:
summing a bit size of the response with a bit size of the schedule unrelated transmission to determine a total bit size; and
using the total bit size for Buffer Status Reporting (BSR).

13. The method of claim 1, wherein the control information is included in a Radio Resource Control (RRC) protocol, a Radio Link Control (RLC) protocol, or a Medium Access Control (MAC) protocol.

14. A method of reliable and efficient information exchange between a first and a second entity, the method comprising:
receiving data from the first entity by the second entity, wherein control information is received along with the data, and wherein the control information includes an indication as to what type of response is required;
determining if a response to the received data is required based on the received control information;
determining a response time during which the response is to be sent to the first entity;
transmitting the response to the first entity before the expiration of the response time;
converting the response to an abbreviated response; and
transmitting the scheduled unrelated transmission including the abbreviated response from the second entity to the first entity, wherein the response is only converted into an abbreviated response when an amount of empty bits in the scheduled unrelated transmission is less than an amount of bits included in the response.

15. The method of claim 14, wherein the abbreviated response does not include a transaction identity, a message identity, or a sequence number.

16. The method of claim 14, wherein the abbreviated response does not include an entire transaction identity, an entire message identity, or an entire sequence number.

17. The method of claim 14, wherein the abbreviated response is generated by removing a number of most significant bits of the sequence number or the message identity.

* * * * *